United States Patent
Reem et al.

[11] Patent Number: 5,667,944
[45] Date of Patent: Sep. 16, 1997

[54] DIGITAL PROCESS SENSITIVITY CORRECTION

[75] Inventors: Richard Carroll Reem, Hilton; James Edward Sutton, Rochester, both of N.Y.

[73] Assignee: Eastman Kodak Company, Rochester, N.Y.

[21] Appl. No.: 636,076

[22] Filed: Apr. 22, 1996

Related U.S. Application Data

[60] Provisional application No. 60/007,036, Oct. 25, 1995.
[51] Int. Cl.⁶ ....................................... G03C 7/18
[52] U.S. Cl. .................. 430/359; 430/30; 399/59
[58] Field of Search .................. 43/30, 359; 355/246

[56] References Cited

U.S. PATENT DOCUMENTS

| | | | |
|---|---|---|---|
| 3,718,074 | 2/1973 | Davis | 95/1.1 |
| 4,577,961 | 3/1986 | Terashita | 355/77 |
| 4,866,513 | 9/1989 | Takahashi | 358/76 |
| 5,060,061 | 10/1991 | Shishido et al. | 358/80 |
| 5,210,600 | 5/1993 | Hirata | 358/76 |
| 5,227,837 | 7/1993 | Terashita | 355/38 |
| 5,300,381 | 4/1994 | Buhr et al. | 430/30 |
| 5,500,316 | 3/1996 | Bogdanowicz et al. | 430/359 |

*Primary Examiner*—Hoa Van Le
*Attorney, Agent, or Firm*—Edward Dugas

[57] ABSTRACT

A method for producing photographic images from a photographic film strip, of the type that uses density values of the photographic film strip to determine the density values of the produced photographic images, the improvement comprising the steps of:

a) forming at least two reference patches of differing exposure conditions onto an otherwise unexposed portion of the photographic film strip prior to photographic processing, each reference patch falling within the total scale of the photographic film strip;

b) photographically processing the photographic film strip to form densities corresponding to the photographic images and said reference patches;

c) scanning said processed photographic film strip to form density representative digital signals for the photographic images and said reference patches;

d) obtaining standard film density values representative of the photographic film strip;

e) calculating gamma correction values from said density representative digital signals corresponding to said reference patches and said standard film density values;

f) utilizing said calculated gamma correction values and said density representative digital signals corresponding to the photographic images to form corrected density representative digital signals; and g) utilizing said corrected density representative digital signals to produce photographic images from the images recorded on the photographic film strip.

27 Claims, 3 Drawing Sheets

DIGITAL PROCESS SENSITIVITY CORRECTION

CROSS REFERENCE TO RELATED APPLICATION

Reference is made to and priority claimed from U.S. Provisional application Ser. No. 60/007,036, filed 25 Oct. 1995, entitled DIGITAL PROCESS SENSITIVITY CORRECTION.

FIELD OF THE INVENTION

The invention relates generally to the field of photography, and in particular to silver halide photography.

BACKGROUND OF THE INVENTION

A photographic system is composed of several stages, which together function to record and generate a reproduction of an original scene. A pleasing reproduction requires a specific relationship between the luminance of the scene, and the density of the reproduced image. Conventional photographic systems are designed such that the characteristic responses of all stages taken together produce the desired relationship between the original scene recorded and the reproduced image. Each stage in the photographic system is subject to variations in its response characteristics which will alter the sought relationship between the original scene and the reproduced image. In each of the classical forms of photography noted below, the final image is intended to be viewed by the human eye. Thus, the conformance of the viewed image to the recorded scene, absent intended aesthetic departures, is the criterion of photographic success.

In classical black-and-white photography, a photographic element containing a silver halide emulsion layer coated on a transparent film support, commonly referred to as a photographic film, is imagewise exposed to light. This produces a latent image within the emulsion layer. The film is then photographically processed to transform the latent image into a silver image that is a negative image of the subject photographed. The resulting processed photographic film, commonly referred to as a negative, is placed between a uniform exposure light source and a second photographic element, commonly referred to as a photographic paper, containing a silver halide emulsion layer coated on a white paper support. Exposure of the emulsion layer of the photographic paper through the negative produces a latent image in the photographic paper that is a positive image of the subject originally photographed. Photographic processing of the photographic paper produces a positive silver image. The image bearing photographic paper is commonly referred to as a print.

In classical color photography the photographic film contains three superimposed silver halide emulsion layer units, one for forming a latent image corresponding to blue (B) light (i.e., Blue) exposure, one for forming a latent image corresponding to green (G) exposure and one for forming a latent image corresponding to red (R) exposure. During photographic processing, complementary subtractive primary dye images are formed—that is, yellow, magenta and cyan dye images are formed in the blue, green and red recording emulsion layers, respectively. This produces negative dye images (i.e., blue, green and red subject features appear yellow, magenta and cyan, respectively). Exposure of color paper through the color negative followed by photographic processing produces a positive color print.

In one common variation of classical color photography reversal processing is undertaken to produce a positive dye image in the color photographic film (commonly referred to as a slide), the image typically being viewed by projection. In another common variation, referred to as color image transfer or instant photography, image dyes are transferred to a receiver for viewing. When positive photographic film images are formed, second generation slides or prints are made by exposing a color photographic material through the color film and reversal processing to form a positive reproduction of the original scene.

The response characteristics of a photographic system are carefully selected to produce a final image that gives a pleasing reproduction of the recorded scene. The ability of the photographic system to deliver the desired final reproduction is dependent on the photographic response of each step in the imaging chain conforming to its intended response. The response characteristics of the photographic system are intentionally chosen to be different depending on the means of viewing the final image. For example, the response characteristics of a photographic system designed to produce a print intended for viewing by reflected light are different than those for a system which produces a transparency image intended for viewing by projection in a darkened surround. Furthermore, the response characteristics of a photographic system may be intentionally altered to produce a final image which is an aesthetic departure from a faithful reproduction of the original scene.

The characteristics of an imaging system can be altered by selecting photographic materials which differ in their response characteristics or by altering the conditions used to photographically process the photographic medium. The ability to alter the contrast of the photographic image produced is limited by the choice of photographic print materials and processes available. In black and white imaging systems it is typical to alter the contrast of the final print made from a negative by selecting photographic papers of different contrasts. Available color photographic papers span a very limited range of contrasts, restricting the photographer's ability to alter the contrast of the final image, with conventional photographic systems.

The color balance of the final print produced by a color photographic imaging system can be altered by adjusting the color of the light source used when exposing the color negative onto the color paper. However, altering the color of the printing light source produces a constant color change throughout the image, equivalent to altering the density of the individual color records of the negative by adding or subtracting a constant amount of density. When differences in contrast exist between the color records of a color negative, the amounts of density change required to produce an image of high quality is dependent on the image densities. Altering the color of the printing light source is not capable of accomplishing the required correction. The inability to correct for differences in contrast between color records results in degradation of the final image produced.

The response of the photographic film is subject to many sources of variation. Sources of variation include manufacturing, length of time and conditions of storage of the photographic film, and photographic processing. Modern film manufacturing methods minimize variations in the freshly manufactured photographic film's ability to record latent images upon exposure to light from an original scene. However, the ability of a photographic film to form a latent image, and the stability of the latent image formed are both subject to variation dependent on the amount of storage time and the conditions of storage. Raw stock keeping (RSK) of a photographic film relates to variations in the photographic film response characteristics dependent on the storage time and conditions prior to exposure of the photographic film to light from the original scene. Latent image keeping (LIK) of a photographic film relates to the stability of the latent image formed during exposure, prior to its photographic processing. Both aspects of photographic film storage stability are subject to significant variations due to the large range of potential storage times and storage conditions routinely encountered in practice. Photographic film response characteristics are also strongly dependent on the conditions of photographic processing. Variations in photographic processing which affect the conversion of latent image to imagewise density arise from variations in the chemical composition, agitation, and temperature of the processing solutions.

All of the effects discussed above, as well as other effects not specifically mentioned, alter the amount of density formed for different levels of exposure. The relationship between the amount of density formed and the input exposure level can be characterized by the rate of density increase with increasing exposure (photographic gamma, $\gamma$), the amount of exposure required to achieve a given density (photographic speed), and the amount of density formed in the absence of exposure ($D_{min}$). As previously discussed, the photographic response characteristics of each photographic material used in forming the final reproduction of the original scene is critical in determining the quality of the final image. Variations in photographic film response propagate through the photographic system influencing the contrast and color quality of the reproduced image. Process sensitivity is a dominant factor responsible for the variability of photographic response affecting the quality of the reproduced image.

When the processed photographic film is used as an intermediate in the formation of a final image, such as a print, variations in the $D_{min}$ and photographic speed of the photographic film can be corrected during conventional printing by adjusting the printing times and the color of the printer light source. In practice, adjustments in the printing conditions are automated by use of a "scene balance algorithm" (SBA). The SBA relies on the measurement of one or more densities of the processed photographic film and an empirically determined relationship between the measured densities and the corrections to be applied to the printing conditions which are most likely to yield an acceptable print.

Original versions of the SBA were based on the observation that the average of all colors contained in a typical recorded scene is a gray of medium lightness. A single density measurement of the entire area of the processed photographic film was made and the printing times and printer light source color were adjusted to make the average color and density of the image match this medium gray. This type of SBA can successfully correct hue shifts arising from the scene illuminant (e.g. daylight, tungsten or fluorescent lighting), and sources of variation in photographic film response which uniformly change the color of the scene (e.g. photographic speed and Dmin), only when the average scene color is a medium gray, as is assumed. When the average density of a photographic film image deviates from an average gray due to the distribution of colors contained within the original scene, adjusting the printing conditions to produce a medium gray will result in unacceptable reproductions of the original scene (termed subject failure). For example, a scene containing large areas of water and sky will have an average density that is bluish and should not be printed to average a medium gray. In other examples, scenes containing large areas of snow would be printed too dark and sunset scenes would be printed too light. To improve the performance of printing algorithms in cases where the original scene does not average to a medium gray, the amount of color correction toward medium gray made in the printing operation is adjusted based on the hue of the average density of the photographic film image. For example, if the average photographic film density deviates from gray in the direction of yellow-orange, the source of the deviation is likely to be tungsten illumination and complete correction will usually be successful. However, if the deviation from medium gray is in the direction of cyan, it is likely that there are large areas of sky or water in the original scene and the printing conditions should not be adjusted to produce a medium gray. For each image, the degree of correction towards neutral is determined by the mapping of the amount of adjustment performed based upon the average hue of the image, referred to as the subject failure suppression boundary.

Another method of determining the amount of correction required in the printing operation is to scan all of the images on a strip of photographically processed film and evaluate the deviations from medium gray of all recorded images. Based on assumptions about the relationships between recorded images, adjustments in the amount of correction toward medium gray of the printing conditions are made. When averaged over an entire sequence of images, hue and density changes due to processing will be constant, but those arising from scene composition will tend to average to medium gray.

More sophisticated algorithms attempt to identify the subject recorded on the photographic film in order to discriminate between hue shifts that require color correction and those that do not. Subject recognition requires multiple density measurements of each photographic film image to determine the location, area, and color of objects in the recorded scene. Recognition of scene content can then be used to determine the amount of correction toward medium gray required when printing the photographic film image.

In all cases, SBA's are used to improve the quality of the reproduced images, without the cost associated with custom printing each image recorded on the photographic film. Furthermore, the operation of every SBA is dependent on an evaluation of the hue of the image contained in the processed photographic film. Unexpected deviations in the response characteristics of the processed photographic film from any of the sources discussed above will affect the ability of a SBA to correctly adjust the printing conditions, degrading the quality of the final image reproduction. In some cases, the parameters of the SBA are adjusted to compensate for variations in the photographic response due to variations in photographic processing conditions characteristic of a single photofinishing operation. This adjustment will typically be incorrect for any single strip of photographic film since the SBA adjustments are determined for the average response of many photographic film strips.

The performance of an automated photographic printer can be further improved by objectively characterizing the photographic response of each individual strip of photographic film. Characterizing the photographic response of each strip of photographic film eliminates the need to adjust the operation of the SBA based on the average properties of all photographic films being handled. Variations in photographic response due to both storage conditions and deviations in photographic processing conditions can be objectively corrected if the photographic response for the photographic film in use is characterized.

R. Davis, U.S. Pat. No. 3,718,074, describes a method of placing reference patches on the photographic film in the camera at the time of exposure of each scene. T. Terashita et al, U.S. Pat. No. 4,577,961, describe a similar method in which the reference patches are applied to the photographic film immediately prior to photographic processing. In both disclosures the densities of the reference patches are measured following photographic processing and the information obtained is used to adjust the operation of the SBA and improve the selection of printing conditions for a conventional optical printing device.

Both of the methods described above are capable of detecting deviations in the response characteristics of the photographic film due to variations in manufacturing, storage, and photographic processing. Recognition of variations in photographic film response is used to improve the performance of SBA's and to more reliably adjust the printing conditions to compensate for variations in image hue due to constant changes in density throughout the photographic film image. Constant changes in image density occur when the Dmin or speed of a photographic film is altered. However, in addition to changes in $D_{min}$ and speed, variations in film manufacturing, storage, or photographic processing affect film gamma. Variations in film gamma result in density changes which depend on film density. Adjustment of the average density of a printed photographic image, as detailed in the methods described above, is not capable of correcting for alterations in photographic film gamma.

With the emergence of computer data processing, interest has developed in extracting the information contained in an imagewise exposed photographic film strip instead of proceeding directly to a viewable image. It is now common practice to extract the information contained in both black-and-white, and color images, by scanning. The most common approach to scanning a black-and-white negative is to record point-by-point or line-by-line the transmission of a scanning light beam, relying on developed silver to modulate the beam. In color photography blue, green and red scanning beams are modulated by the yellow, magenta and cyan image dyes. In a variant color scanning approach the blue, green and red scanning beams are combined into a single white scanning beam which is modulated by the image dyes, and is read through red, green and blue filters to create three separate records. The records produced by image dye modulation can then be read into any convenient memory medium (e.g., an optical disk) where the information is free of the classical restraints of photographic embodiments. Systematic manipulation (e.g., image reversal, hue alteration, etc.) of the image information that would be cumbersome or impossible to achieve in a controlled and reversible manner in a photographic element is readily achieved. The stored information can be used to modulate light exposures necessary to recreate the image as a photographic negative, slide, or print. Alternatively, the image can be viewed as a video display or printed by a variety of techniques beyond the bounds of classical photography—e.g., xerography, ink jet printing, dye diffusion printing, etc.

I. Shishido et al, U.S. Pat. No. 5,060,061, describe a means for correcting the effect of variations in photographic film response characteristics by measuring the density of an unexposed region of the photographic film ($D_{min}$). The photographic image is also scanned to give a digital representation of the image densities. Comparison of the measured $D_{min}$ with the predetermined $D_{min}$ characteristics of the film type are used to select a predetermined look-up-table (LUT), which is used to modify a digital representation of the image densities, in order to adjust the tone of the image. This approach is limited in that alterations in the tone scale are made based on the characteristics of photographic film $D_{min}$ only. Variations in photographic speed and gamma of a photographic film can occur without concomitant changes in the $D_{min}$. Using the approach of Shishido, deviations in photographic speed and gamma would go undetected and uncorrected in the printing operation. Furthermore, the range of variations which can be corrected is limited to those that have been predetermined. Variations not anticipated will remain uncorrected.

SUMMARY OF THE INVENTION

The present invention is directed to overcoming one or more of the problems set forth above. Briefly summarized, according to one aspect of the present invention there is provided a method for producing photographic images from a photographic film strip, of the type that uses density values of the photographic film strip to determine the density values of the produced photographic images, the improvement comprising the steps of:

a) forming at least two reference patches of differing exposure conditions onto an otherwise unexposed portion of the photographic film strip prior to photographic processing, each reference patch falling within the total scale of the photographic film strip;

b) photographically processing the photographic film strip to form densities corresponding to the photographic images and said reference patches;

c) scanning said processed photographic film strip to form density representative digital signals for the photographic images and said reference patches;

d) obtaining standard film density values representative of the photographic film strip;

e) calculating gamma correction values from said density representative digital signals corresponding to said reference patches and said standard film density values;

f) utilizing said calculated gamma correction values and said density representative digital signals corresponding to the photographic images to form corrected density representative digital signals; and g) utilizing said corrected density representative digital signals to produce photographic images from the images recorded on the photographic film strip.

It is thus an object of the present invention to provide a method of correcting for unwanted variations in photographic film response, when the photographic film image is scanned and digitally printed or displayed, which overcomes the limitations of the prior art.

The invention improves over the art in that it can yield useful quality improvements in reproduced images when variations in photographic film response occur which affect film gamma.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

The invention is equally applicable to black-and-white and color recording photographic films. Furthermore, the invention is equally applicable to both positive and negative working photographic films. Unless otherwise indicated, the following discussion will relate to negative working, color recording photographic films.

This invention describes the determination of correction values which are subsequently used to transform digital signals representative of the photographic image. The term "correction value" in this application is taken to refer to a broad range of mathematical operations which include, but are not limited to, mathematical constants, matrices, linear and nonlinear mathematical relationships, and look-up-tables (LUT's).

Figure 1:
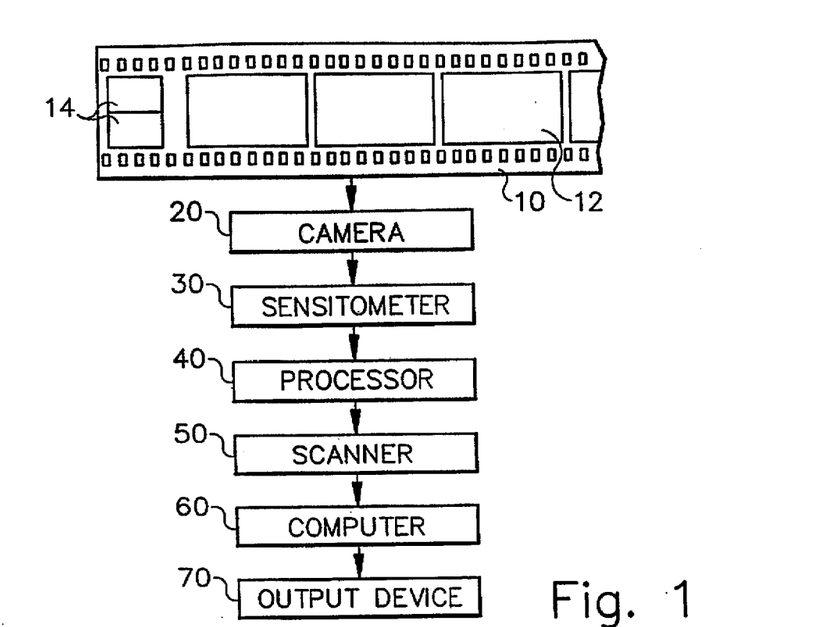
FIG. 1 illustrates in block diagram form the preferred system arrangement of the present invention.
Figure 4:
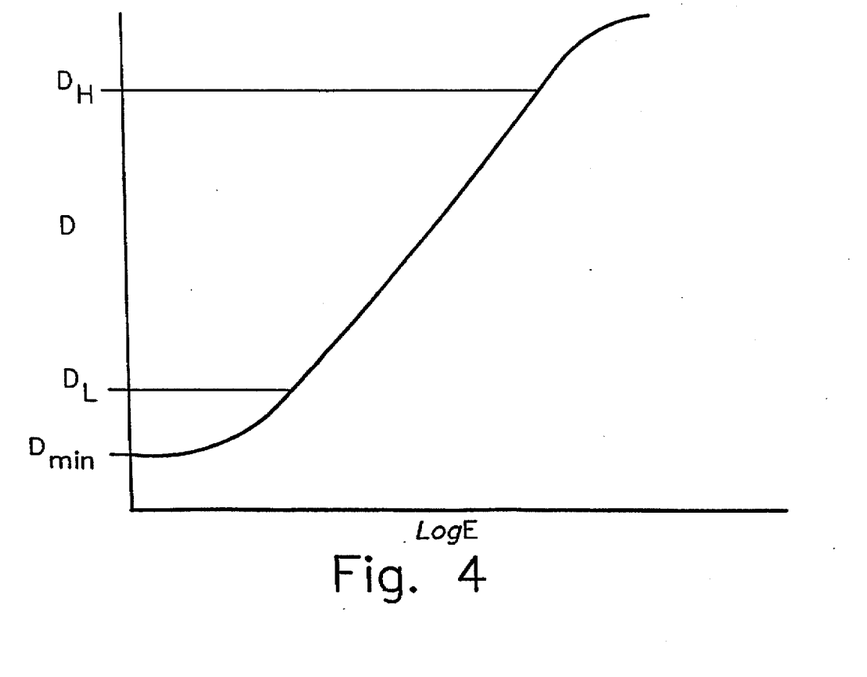
FIG. 4 is a plot illustrating the D Log E response of the film to reference exposures.

In the simplest form, characterization of photographic film gamma requires the use of two reference patches with exposure levels which, exceed the minimum exposure required to produce a density above the minimum density formed in the absence of exposure (Dmin), and are less than the exposure at which further increase in exposure no longer results in increased density ($D_{max}$), following photographic processing. This exposure range is commonly referred to as the total scale of the photographic film, as discussed in JAMES, THE THEORY OF THE PHOTOGRAPHIC PROCESS, PAGE 501, 502 (4TH ED. 1977, EASTMAN KODAK COMPANY). The portion of the total scale that produces a linear density response verses log exposure is referred to as the linear exposure scale. Preferably the reference patch exposures are neutral. Referring to FIG. 1, a photographic film strip 10 has image areas 12 exposed to a scene by means of camera 20. Reference patches 14 are exposed onto the photographic film strip 10 by the sensitometer 30. The sensitometer 30 may be positioned in the camera 20 to place the reference patches 14 onto the photographic film strip 10 either prior to or after the placement of images 12. In another preferred embodiment, the reference patches are placed onto the photographic film at the time of manufacture. A third preferred embodiment would place the reference patches onto the photographic film following removal from the camera, prior to photographic processing. The reference patches 14 may be placed at any region of the photographic film strip 10 that will not otherwise be exposed, such as the portion of the photographic film strip that does not come out of the film cartridge or the edge of the photographic film that is not within the image frame. In a preferred form of the invention, the specified region of the photographic film strip 10 is reserved for recording reference patches. The reference patch exposure levels are chosen to be as different as possible while still falling within the total scale, and preferably within the linear response scale, of the photographic film strip 10, as shown in FIG. 4.

The photographic film strip 10 is photographically processed in the processor 40 in the well known manner (e.g. C41, E6, etc.) following placement of all photographic images and reference patches onto the photographic film strip. The photographically processed film is then scanned by scanner 50 producing density representative digital signals which are forwarded to a computer 60 for processing. The processed digital signals are then forwarded to an output device 70. The output device 70 may take a number of forms such as a silver halide film or paper writer, thermal printer, electrophotographic printer, ink jet printer, CRT display, CD disc or other types of storage and display devices.

Figure 2:
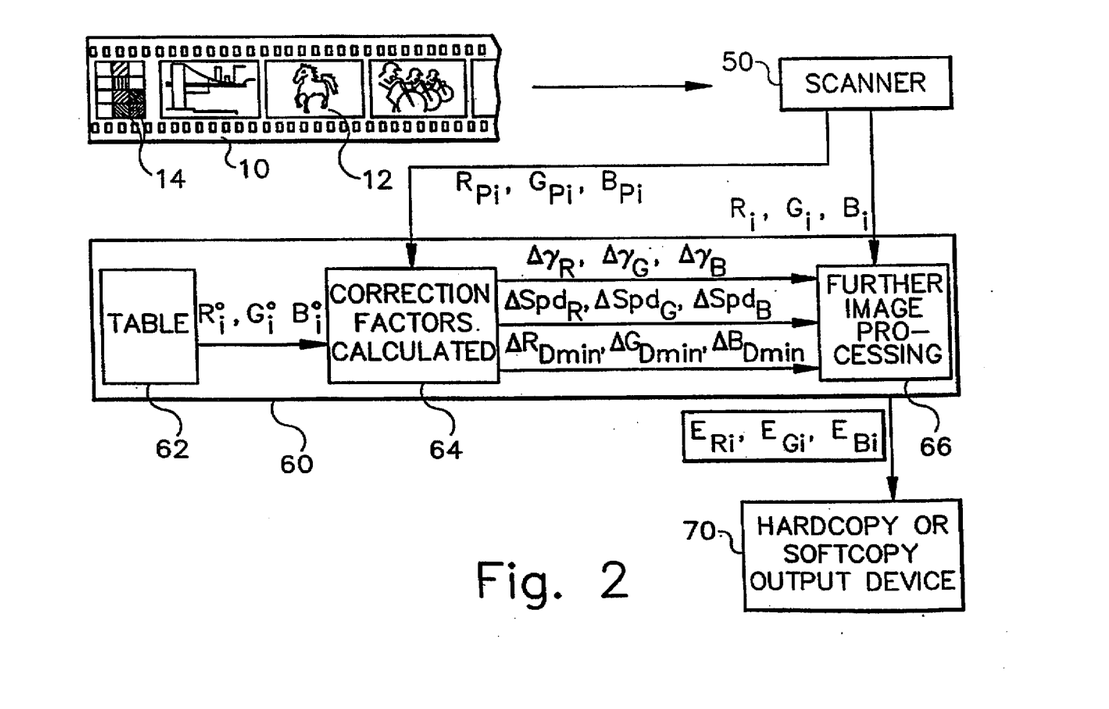
FIG. 2 illustrates in a detailed block diagram form the details of one of the major blocks of FIG. 1.

Referring now to FIG. 2, the processed photographic film strip 10 that is scanned by the scanner 50, is shown in more detail with a number of reference patches 14. The density representative digital signals from the scanner 50 obtained for reference patches 14 ($R_{Pi}$, $G_{Pi}$, $B_{Pi}$) and for the photographic image 12 ($R_i$, $G_i$, and $B_i$) are forwarded to the computer 60. The density representative digital signals of the reference patches 14 are compared with the standard film densities ($R^o_i$, $G^o_i$, $B^o_i$) which are stored in a table 62 and originate from well manufactured, correctly stored and photographically processed film of the same photographic film type as film 10, given exposures which differ in intensity by the same amount as those used to obtain the reference patches 14 on the photographic film strip 10. The table 62 is to be populated with those standard film densities that correspond to the photographic film types that are to be processed by this technique. The comparison takes place in block 64. In the simplest form of the invention, only two reference patches 14 are used. The differences are used to calculate γ correction values according to Eqs. 1–3.

$$\Delta\gamma_R = \frac{R_H^o - R_L^o}{R_H - R_L} \quad (1)$$

$$\Delta\gamma_G = \frac{G_H^o - G_L^o}{G_H - G_L} \quad (2)$$

$$\Delta\gamma_B = \frac{B_H^o - B_L^o}{B_H - B_L} \quad (3)$$

In Eqs. 1–3, H and L refer to the high and low density reference patches, respectively, and the superscript "o" refers to the values for the standard film densities obtained with "well controlled (manufacturing, storage, and processing) conditions."

The gamma correction values are used in the further image processing block 66 of the density representative digital signals of the image 12 to provide the corrected red, green and blue exposure representative digital signals ($E_{Ri}$, $E_{Gi}$, $E_{Bi}$) to the output device 70. The details of processing block 66 are set forth in FIG. 3.

Figure 3:
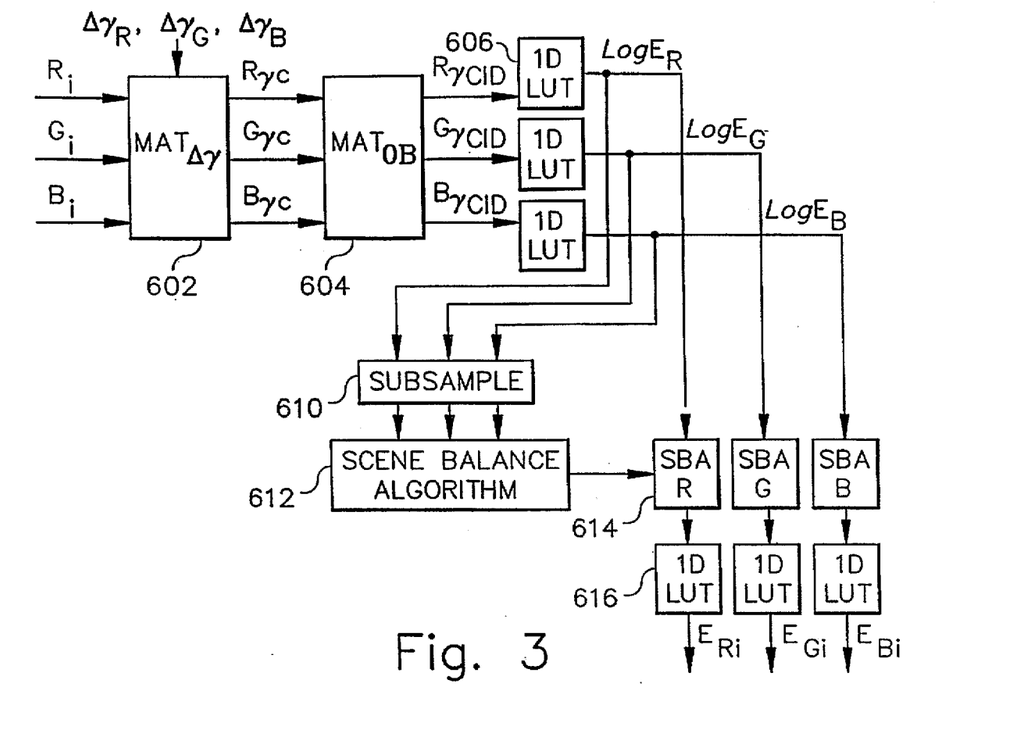
FIG. 3 illustrates in detail the further image processing block of FIG. 2.

A typical image processing path is shown in FIG. 3. Density representative digital signals $R_i$, $G_i$, and $B_i$ from the image 12 are processed using a matrix 602. Matrix 602 is represented as follows:

$$MAT_{\Delta\gamma} = \begin{bmatrix} a_1 & a_4 & a_5 \\ a_7 & a_2 & a_6 \\ a_8 & a_9 & a_3 \end{bmatrix} \quad (4)$$

In its simplest form, the off diagonal elements ($a_4 \rightarrow a_9$) of $MAT_{\Delta\gamma}$ are all zero, and the diagonal elements, $a_1 \rightarrow a_3$, are $\Delta\gamma_R$, $\Delta\gamma_G$, and $\Delta\gamma_B$, respectively, and are calculated using Eqs. 1–3 for the photographic film strip 10 being processed. As shown in Eq. 5, the matrix pre-multiplies the red, green and blue density representative digital signals of each scanned image 12 producing the gamma corrected density representative digital signals ($R_{\gamma c}$, $G_{\gamma c}$, $B_{\gamma c}$).

$$\begin{bmatrix} R_{\gamma c_i} \\ G_{\gamma c_i} \\ B_{\gamma c_i} \end{bmatrix} = [MAT\Delta_\gamma] \begin{bmatrix} R_i \\ G_i \\ B_i \end{bmatrix} \quad (5)$$

Figure 5:
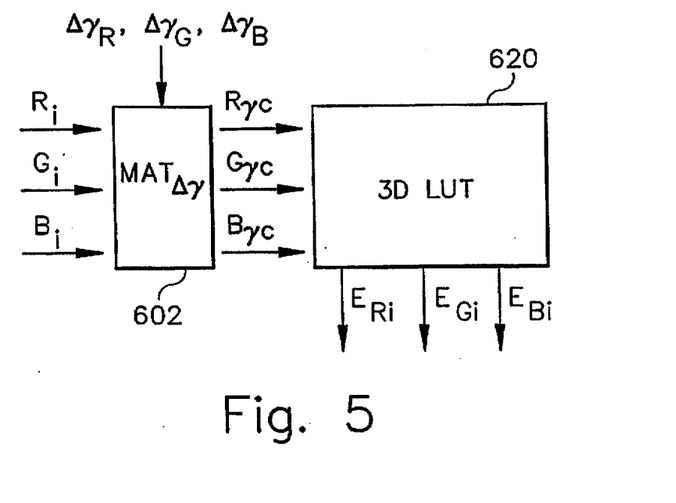
FIG. 5 illustrates in detail the further image processing block of FIG. 2.

Further processing of the gamma corrected density representative digital signals with matrix 604 produces channel independent density representative digital signals ($R_{\gamma CID}$, $G_{\gamma CID}$, $B_{\gamma CID}$). The red, green, and blue channel independent density representative digital signals are then converted to log exposure representative digital signals by the use of three one dimensional LUT's 606. The log exposure representative digital signals for the image 12 are subsampled in block 610 at a nominal rate of 1/256th of the full image resolution. A scene balance algorithm 612 is performed on the subsampled signals producing scene balance shift factors. The shift factors are added to the full resolution log exposure representative digital signals in the SBA blocks 614. Three one dimensional LUT's 616 convert the corrected log exposure representative digital signals to corresponding linear exposure representative digital signals. The linear exposure representative digital signals are premultiplied by a predetermined matrix (MAT 1) to form a second set of red, green, and blue linear exposure representative digital signals. FIG. 5 shows an alternative preferred form of the invention, which replaces image processing by components 604 through 616 with a single three dimensional LUT 620.

In another preferred embodiment of the invention, a third reference density measurement is made in a region of the photographic film strip 10 which has received no exposure. Density representative digital signals for the unexposed region of the photographic film are obtained ($R_{Dmin}$, $G_{Dmin}$, and $B_{Dmin}$) from scanner 50. The resulting signals for the unexposed region of the photographic film are compared (FIG. 2, block 64) against standard film densities for an unexposed region of the photographic film ($R^o_{Dmin}$, $G^o_{Dmin}$, $B^o_{Dmin}$) which are stored in a table 62 and originate from well manufactured, correctly stored and photographically processed photographic film of the same film type as film 10. The comparison takes place in block 64 where the differences are used to calculate $D_{min}$ correction values according to Eqs. 6–8.

$$\Delta R_{Dmin} = \Delta\gamma_R R_{Dmin} - R^o_{Dmin} \quad (6)$$

$$\Delta G_{Dmin} = \Delta\gamma_G G_{Dmin} - G^o_{Dmin} \quad (7)$$

$$\Delta B_{Dmin} = \Delta\gamma_B B_{Dmin} - B^o_{Dmin} \quad (8)$$

Figure 6:
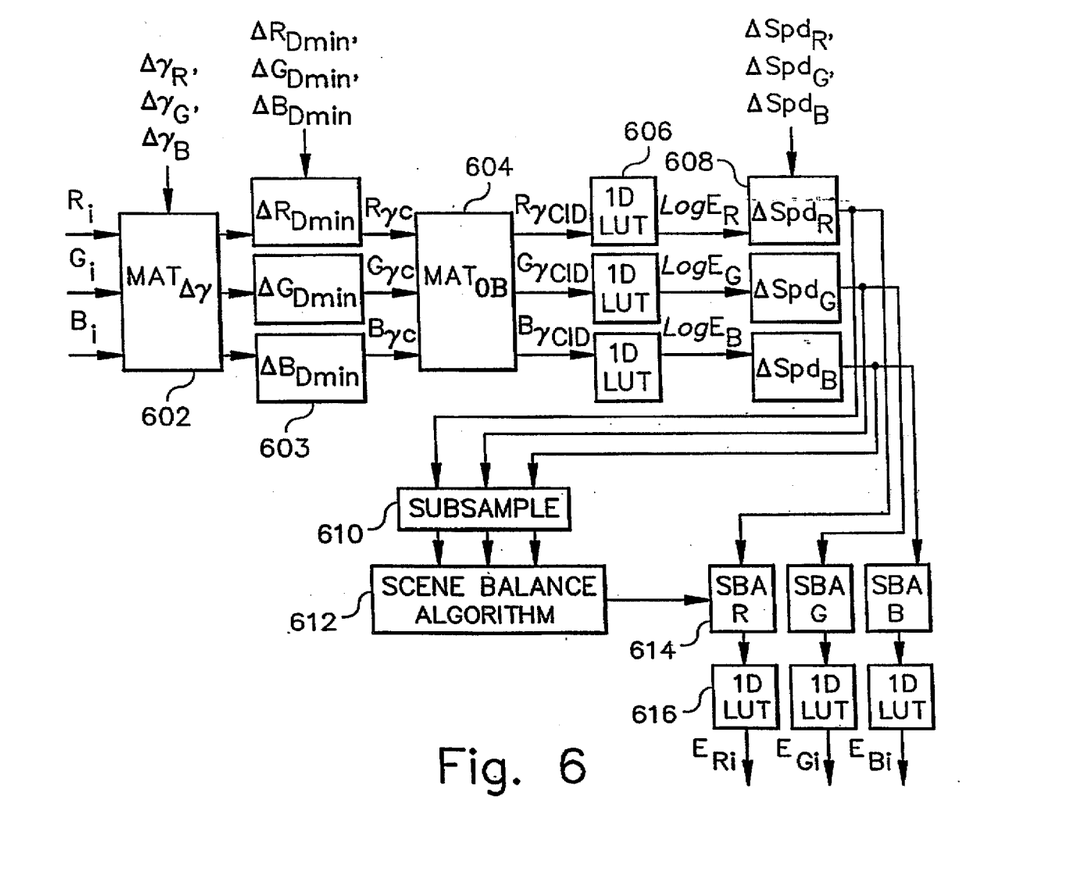
FIG. 6 illustrates in detail the further image processing block of FIG. 2.

The $D_{min}$ correction values are subtracted from the density representative signals of the scanned image in block 603 of FIG. 6.

A further improvement in performance is obtained if the absolute levels of exposure used to produce the reference patches 14 on the photographic film strip 10 are known relative to those used to obtain the standard film densities ($R^o_i$, $G^o_i$, $B^o_i$) which are stored in a table 62 and originate from well manufactured, correctly stored and photographically processed film of the same film type as film 10. Photographic speed values can be calculated using Eqs. 9–11, $$Spd_R = \frac{R_{Dmin} - \left(R_L - \left(\frac{R_H - R_L}{E_H - E_L} * E_L\right)\right)}{\frac{R_H - R_L}{E_H - E_L}} \quad (9)$$

$$Spd_G = \frac{G_{Dmin} - \left(G_L - \left(\frac{G_H - G_L}{E_H - E_L} * E_L\right)\right)}{\frac{G_H - G_L}{E_H - E_L}} \quad (10)$$

$$Spd_B = \frac{B_{Dmin} - \left(B_L - \left(\frac{B_H - B_L}{E_H - E_L} * E_L\right)\right)}{\frac{B_H - B_L}{E_H - E_L}} \quad (11)$$

where E is the log exposure value of the reference patch.

$$\Delta Spd_R = Spd_R - Spd^o_R \quad (12)$$

$$\Delta Spd_G = Spd_G - Spd^o_G \quad (13)$$

$$\Delta Spd_B = Spd_B - Spd^o_B \quad (14)$$

Speed correction values ($\Delta Spd$) are obtained by comparing the speed values determined for the scanned photographic film strip and those obtained from the standard film densities of well manufactured, correctly stored and photographically processed photographic film of the same film type as film 10, using Eqs. 12–14. The obtained speed correction values are subtracted from the log exposure representative digital signals of the scanned image resulting from LUT 606 in block 608 (FIG. 6). The speed corrected image signals improve the performance of the SBA 612 by allowing the subject failure suppression boundaries to be adjusted for better differentiation of hue shifts due to the illuminant and those resulting from elements in the image, producing superior reproductions of the recorded scene.

Although the invention can be practiced with as few as two reference patches, other preferred embodiments of the invention utilize a larger number of exposure patches of the same or different color. A larger number of reference patches, for example, 20 levels, allow a more robust estimation of speed and γ correction values, and the ability to correct for more specific changes in the relationship between density produced on the photographically processed film and input exposure.

When more than two reference patches are used, γ and speed correction values are obtained by comparing the density representative digital signals determined for the references patches and the standard film densities using standard methods of regression. When n reference patches are utilized, speed and gamma correction values are chosen for each record to minimize $\Delta R_{RMS}$, $\Delta G_{RMS}$, and $\Delta B_{RMS}$ as defined in Eqs. 15–17, where the n reference patches fall within the total scale of the photographic film. Speed and γ correction values obtained in this manner are applied to the scanned image signals as described above. Use of more than two reference patches allows a more reliable determination of the γ correction values appropriate for the total scale of the photographic film and is less sensitive to the placement of the exposure levels within the total scale.

$$\Delta R_{RMS} = \sqrt{\sum_{i=1}^{n} (R_i^o - R_{Dmin} - ((R_i - R_{Dmin}) * \Delta\gamma_R + \Delta Spd_R * \gamma_R^o))^2} \quad (15)$$

-continued $$\Delta G_{RMS} = \sqrt{\sum_{i=1}^{n} (G_i^o - G_{Dmin} - ((G_i - G_{Dmin})*\Delta\gamma_G + \Delta Spd_G*\gamma_G^o))^2} \quad (16)$$

$$\Delta B_{RMS} = \sqrt{\sum_{i=1}^{n} (B_i^o - B_{Dmin} - ((B_i - B_{Dmin})*\Delta\gamma_B + \Delta Spd_B*\gamma_B^o))^2} \quad (17)$$

An alternative and preferred method of applying correction values obtained from many reference patches is to replace the three one-dimensional LUT's 606 with the density-log exposure relationships obtained from the reference patch data.

A further affect of variations in photographic film manufacturing, storage, and photographic processing is to alter the extent of density formation in one image record dependent on the extent of density formation in at least one of the remaining image records. A preferred embodiment of the invention involves the use of multiple reference patches, each differing from the others in at least one attribute of color and intensity. The density representative digital signals obtained from scanning the multiple reference patches are compared with standard film densities which are stored in a table 62 and originate from well manufactured, correctly stored and photographically processed film of the same photographic film type as film 10. The nine elements of matrix 602 ($MAT_{\Delta\gamma}$) are determined by standard methods of regression to minimize the differences ($\Delta_{RMS}$, Eq. 19) between the signals obtained from the reference patches when processed with matrix 602 (Eq. 18) and the standard film densities.

$$\begin{bmatrix} R_{\gamma c_i} \\ G_{\gamma c_i} \\ B_{\gamma c_i} \end{bmatrix} = [MAT_{\Delta\gamma}] \begin{bmatrix} R_i \\ G_i \\ B_i \end{bmatrix} \quad (18)$$

$$\Delta_{RMS} = \sqrt{\sum_{i=1}^{n} [(R_i^o - R_{\gamma ci})^2 + (G_i^o - G_{\gamma ci})^2 + (B_i^o - B_{\gamma ci})^2]} \quad (19)$$

EXAMPLES

Replicate strips of three commercially available color negative, camera origination photographic film products were obtained, and exposed with 21 levels of neutral reference patches, 64 reference patches of differing color exposures, and a variety of scenes. One set of exposures for each photographic film type was photographically processed using standard Kodak Flexicolor™ C41 processing (4.5 g/l N-ethyl-N-(β-hydroxyethyl)-3-methyl-p-phenylenediamine sulphate (CD-4), 1.3 g/l NaBr, pH 10.03), a second set was processed in a similar fashion with the exception that the developer level, bromide ion level and pH level were changed to increase the activity of the process (5.5 g/l CD-4, 0.8 g/l NaBr, pH 10.13), and a third set of exposed strips was processed in a similar fashion to the first set with the exception that the developer level, bromide ion level and pH level were changed to decrease the activity of the process (3.5 g/l CD-4, 1.8 g/l NaBr, pH 9.93). These variations in processing conditions are representative of those encountered in the photofinishing industry. Following photographic processing, the photographic images of the recorded scenes and reference patches were scanned using an optoelectronic scanning device to yield density representative digital signals.

TABLE 1

Correction values for three selected consumer films

| | $\Delta\gamma_R$ | $\Delta\gamma_G$ | $\Delta\gamma_B$ | $\Delta Spd_R$ | $\Delta Spd_G$ | $\Delta Spd_B$ | $\Delta R_{Dmin}$ | $\Delta G_{Dmin}$ | $\Delta B_{Dmin}$ |
|---|---|---|---|---|---|---|---|---|---|
| Film 1 Hi Activity | 0.856 | 0.932 | 0.97 | −.759 | −.246 | −1.66 | −.349 | −1.369 | −.759 |
| Film 1 Lo Activity | 1.339 | 1.159 | 1.209 | 1.206 | 1.827 | 2.234 | .035 | .256 | .23 |
| Film 2 Hi Activity | 0.877 | 0.931 | 0.905 | .196 | −1.042 | −.297 | −.844 | −.639 | −.475 |
| Film 2 Lo Activity | 1.166 | 1.111 | 1.093 | 1.045 | 2.817 | 2.912 | .35 | .141 | .11 |
| Film 3 Hi Activity | 0.882 | 0.909 | 0.873 | .358 | −.369 | −2.363 | −1.625 | −1.055 | −.256 |
| Film 3 Lo Activity | 1.366 | 1.275 | 1.399 | .196 | 1.089 | 2.116 | .135 | .111 | −.828 |

Equations 1, 4, 5, and 6, were used to calculate γ correction values, $D_{min}$ correction values, and speed correction values, using two reference patches which differed in intensity by 1.0 log exposure units. The lower reference patch exposure level was placed at a density of approximately 0.2 above $D_{min}$ for each photographic film type when photographically processed under the normal conditions. The γ, speed, and $D_{min}$ correction values calculated with the two point method for the three films, processed with the high and low activity photographic processing conditions, are shown in Table 1. The complete set of neutral reference exposures was alternately used to calculate γ correction values, Dmin correction values, and speed correction values, using standard methods of regression.

The complete set of reference patches was used to determine the nine elements of matrix 602 by standard methods of regression. The correction matrices 602 for the three films, processed with the high and low activity photographic processing conditions, are shown in Table 2.

TABLE 2

MAT$_{\Delta\gamma}$ for Photographic Film Processed Under Different
Conditions, Calculated by Regression Based Upon
64 Color Exposures

|  | High Activity | | | Low Activity | | |
|---|---|---|---|---|---|---|
| Color Negative Film 1 | $\begin{bmatrix} .836 \\ .064 \\ .039 \end{bmatrix}$ | $\begin{matrix} -.034 \\ .753 \\ -.071 \end{matrix}$ | $\begin{matrix} .059 \\ .113 \\ .999 \end{matrix}$ | $\begin{bmatrix} 1.30 \\ .044 \\ .005 \end{bmatrix}$ | $\begin{matrix} .052 \\ 1.267 \\ .105 \end{matrix}$ | $\begin{matrix} -.018 \\ -.152 \\ 1.093 \end{matrix}$ |
| Color Negative Film 2 | $\begin{bmatrix} .861 \\ .018 \\ -.010 \end{bmatrix}$ | $\begin{matrix} .026 \\ .900 \\ .006 \end{matrix}$ | $\begin{matrix} -.018 \\ .012 \\ .910 \end{matrix}$ | $\begin{bmatrix} 1.209 \\ -.034 \\ .003 \end{bmatrix}$ | $\begin{matrix} -.021 \\ 1.213 \\ -.048 \end{matrix}$ | $\begin{matrix} -.020 \\ -.068 \\ 1.137 \end{matrix}$ |
| Color Negative Film 3 | $\begin{bmatrix} .857 \\ -.049 \\ .014 \end{bmatrix}$ | $\begin{matrix} -.006 \\ .942 \\ -.023 \end{matrix}$ | $\begin{matrix} .031 \\ .017 \\ .880 \end{matrix}$ | $\begin{bmatrix} 1.393 \\ .075 \\ -.038 \end{bmatrix}$ | $\begin{matrix} -.054 \\ 1.146 \\ -.020 \end{matrix}$ | $\begin{matrix} .031 \\ .064 \\ 1.461 \end{matrix}$ |

The scanned density representative digital signals for the recorded scene were processed according to the image processing schemes shown in FIG. 3 or FIG. 6. The resulting exposure representative digital signals were used to drive a digital exposing device using silver halide photographic paper to make prints. Sets of reference prints for the three films were produced in the same manner, using the density representative digital signals from the strips processed with the standard activity process, and processing according to the image processing schemes shown in FIG. 3, excluding MAT$_{\Delta\gamma}$ 602.

The images were compared in two ways: by comparing the exposure representative digital signals for the images following image processing with and without correction according to the invention, and by visually comparing the associated silver halide prints produced. The exposure representative digital signals were compared by calculating the average root mean squared difference according to Eq. 20, where the summation is conducted over the i pixels and j color records of the image and $E^N_{ij}$ corresponds to the exposure representative digital signals for the photographic film image produced using normal photographic processing conditions and a standard scene balance algorithm, and $E^C_{ij}$ corresponds to exposure representative digital signals for the photographic film image produced using non-standard photographic processing conditions, after applying the digital correction values according to the invention. Accordingly, photographic films subjected to non-standard photographic processing are fully corrected if the RMS deviation is found to be zero following image processing. The larger the value of the RMS deviation, the less successful the correction of the image signals and the lower the quality of the resultant photographic reproduction.

$$\Delta_{RMS} = \sqrt{\frac{\sum_{ij}(E^N_{ij} - E^C_{ij})^2}{i*j}} \quad (20)$$

The visual comparison utilized a panel of five observers who compared the prepared photographic prints for overall image quality. Excellent correlation was found between the trends observed in comparing the exposure representative digital signals, and the ranking of the images for quality by the panel of judges; increased print quality was observed as the magnitude of the RMS difference decreased.

Large RMS values were observed for images produced in the high or low activity photographic process and image processed without the SBA 612, when compared with images produced in the normal process, indicating a significant deviation in the densities due to the non-standard photographic processing conditions. Application of the SBA 612, according to the prior art, to the image signals of the high or low activity photographic process reduces the magnitude of the RMS values, but the residual error gives an observed degradation of the photographic print. The examples below show that the further image processing according to this invention gives significant improvement in the photographic print over that obtained using the prior art.

Example 1

Table 3 shows the results obtained for color negative film #2, photographically processed under the high activity chemical process. When the image is processed following FIG. 3, omitting γ correction matrix 602, the scene balance algorithm is seen to substantially correct for the high activity process variations (smaller RMS value in Table 3, relative to the RMS value without implementation of the SBA). Inclusion of γ correction matrix 602 is seen to significantly decrease variation due to the high activity photographic process. This results in significantly improved final image quality when γ correction is employed, compared with images where only the scene balance algorithm is used.

TABLE 3

RMS Difference Between Exposure Representative Image Signals for Photographic Film Photographically Processed Under Normal and High Activity Conditions

| Image Processing Conditions | Color Negative Film #2 |
|---|---|
| High Activity Chemical Process | |
| Without SBA 612 | 40.85 |
| With SBA 612 | 10.55 |
| With γ Correction 602 (diagonal elements only) and SBA 612 | 4.84 |

Example 2

Table 4 shows the results obtained for color negative films #1, #2 and #3, each photographically processed under the high activity chemical process. When image processed including a current scene balance algorithm, images from all three photographic films are substantially improved for the high activity process (smaller RMS values in Table 4, relative to the RMS value without implementation of the SBA). Image processing of the density representative digital signals according to FIG. 6, including γ correction matrix 602 and speed correction block 608, as well as the scene balance algorithm 612, is seen to significantly decrease variation due to the high activity photographic processing, relative to use of the SBA alone, resulting in significantly improved quality of the final images.

lated using regression rather than the values in Table 1. The RMS values obtained are substantially the same as those shown in Tables 4 and 5. Again the image processing

TABLE 4

RMS Difference Between Exposure Representative Image Signals for Photographic Film Photographically Processed Under Normal and High Activity Conditions

| Image Processing Conditions | Color Negative Film #1 | Color Negative Film #2 | Color Negative Film #3 |
|---|---|---|---|
| High Activity Chemical Process | | | |
| Without SBA 612 | 58.23 | 40.85 | 52.51 |
| With SBA 612 | 11.43 | 10.55 | 14.54 |
| With γ correction 602 (diagonal elements only) speed correction 608, and SBA 612 | 10.62 | 5.62 | 8.84 |

Example 3

Table 5 shows the results obtained for color negative film #3, photographically processed using the low activity chemical process. Image processing of the density representative digital signals, including a current scene balance algorithm, substantially improved image quality for the low activity process (smaller RMS values in Table 5, relative to the RMS value without implementation of the SBA). Image processing of the density representative digital signals according to FIG. 6, including γ correction matrix 602 and speed correction block 608, as well as the scene balance algorithm 612, is seen to significantly decrease variation due to the low activity photographic processing, relative to use of the SBA alone, resulting in significantly improved quality of the final images.

described in FIG. 6 is seen to significantly decrease variation due to both the high and low activity photographic processing, relative to use of the SBA alone, resulting in significantly improved quality of the final images.

Example 5

Table 6 shows the results obtained for color negative films #1, #2, and #3, photographically processed using the high activity chemical process. RMS values are shown for images from the three films in which density representative digital signals were image processed including a current scene balance algorithm, and in which the same images are image processed according to FIG. 6, including γ correction matrix 602 and speed correction block 608, as well as the scene balance algorithm 612, reproducing Table 4. For the final entry in Table 6, the density representative digital signals

TABLE 5

RMS Difference Between Exposure Representative Image Signals for Photographic Film Photographically Processed Under Normal and Low Activity Conditions.

| Image Processing Conditions | Color Negative Film #3 |
|---|---|
| Low Activity Chemical Process | |
| Without SBA 612 | 37.85 |
| With SBA 612 | 15.38 |
| With γ Correction 602 (diagonal elements only), speed correction 608, and SBA 612 | 9.48 |

Example 4

The gamma correction values, speed correction values and $D_{min}$ correction values were recalculated using standard regression techniques. Density representative digital signals for examples 2 and 3, for photographic films photographically processed in the high and low activity processes, were image processed according to FIG. 6, including γ correction matrix 602 and speed correction block 608, as well as the scene balance algorithm 612, using correction values calcufrom the same images are image processed according to FIG. 6, including γ correction matrix 602 using γ correction matrices from Table 2 rather than the simple diagonal γ correction values from Table 1, speed correction block 608, and scene balance algorithm 612. The γ correction matrix is shown to further significantly decrease variation caused by the high activity photographic process for film #1, resulting in significantly improved quality of the final images for this film.

TABLE 6

RMS Difference Between Exposure Representative Image Signals for Photographic Film Photographically Processed Under Normal and High Activity Conditions.

| Image Processing Conditions | Color Negative Film #1 | Color Negative Film #2 | Color Negative Film #3 |
|---|---|---|---|
| High Activity Chemical Process | | | |
| Without SBA 612 | 58.23 | 40.85 | 52.51 |
| With SBA 612 | 11.43 | 10.55 | 14.54 |
| With γ Correction 602 (diagonal elements only), speed correction 608, and SBA 612 | 10.62 | 5.62 | 8.84 |
| With γ Correction 602 (all elements), speed correction 608, and SBA 612 | 8.20 | 5.47 | 8.15 |

The invention has been described with reference to certain preferred embodiments. However, it will be appreciated that variations and modifications can be effected by a person of ordinary skill in the art without departing from the scope of the invention.

Parts List:

| | |
|---|---|
| 10 | photographic film strip |
| 12 | image(s) |
| 14 | reference patches |
| 20 | camera |
| 30 | sensitometer |
| 40 | processor |
| 50 | scanner |
| 60 | computer |
| 62 | table |
| 64 | comparison block |
| 66 | processing block |
| 70 | output device |
| 602 | matrix |
| 603 | block |
| 604 | matrix |
| 606 | look up table (LUT) |
| 608 | speed correction blocks |
| 610 | subsample block |
| 612 | scene balance algorithm (SBA) |
| 614 | block |
| 616 | look up table (LUT) |
| 620 | look up table (LUT) |

We claim:

1. A method for producing photographic images from a photographic film strip, of the type that uses density values of the photographic film strip to determine the density values of the produced photographic images, the improvement comprising the steps of:

a) forming at least two reference patches of differing exposure conditions onto an otherwise unexposed portion of the photographic film strip prior to photographic processing, each reference patch falling within the total scale of the photographic film strip;

b) photographically processing the photographic film strip to form densities corresponding to the photographic images and said reference patches;

c) scanning said processed photographic film strip to form density representative digital signals for the photographic images and said reference patches;

d) obtaining standard film density values representative of the photographic film strip;

e) calculating gamma correction values from said density representative digital signals corresponding to said reference patches and said standard film density values;

f) utilizing said calculated gamma correction values and said density representative digital signals corresponding to the photographic images to form corrected density representative digital signals; and g) utilizing said corrected density representative digital signals to produce photographic images from the images recorded on the photographic film strip.

2. A method according to claim 1 wherein said reference patches are formed on the photographic film strip as part of the manufacturing operation.

3. A method according to claim 1 wherein said reference patches are formed on the photographic film strip at substantially the same time that each image is exposed onto the film strip.

4. A method according to claim 1 wherein said reference patches are formed on the photographic film strip as an initial step of said photographic processing step.

5. A method according to claim 1 wherein step f) forms corrected density representative digital signals by multiplying said density representative digital signals corresponding to the photographic images by said gamma correction values.

6. A method according to claim 1 wherein said gamma correction values take the form of one dimensional look-up-tables relating said density representative digital signals corresponding to the photographic images to said corrected density representative digital signals.

7. A method according to claim 1 wherein two reference patches are used and the calculation of said gamma correction values is performed by determining:

$$\Delta \gamma_D = \frac{D_H{}^o - D_L{}^o}{D_H - D_L}$$

8. A method according to claim 1 wherein three or more reference patches are used and said gamma correction values are determined based on the regression of said density representative digital signals corresponding to said reference patches with standard film density values.

9. A method according to claim 1 wherein the photographic film strip is positive working.

10. A method according to claim 1 wherein the photographic film is negative working.

11. A method according to claim 1 wherein the photographic film strip is a color film of the type that uses R, G, and B, density values of the photographic film strip to determine the R, G, and B, density values of the produced photographic images.

12. A method according to claim 11 wherein three or more reference patches are used and at least one reference patch differs in color from the other reference patches.

13. A method according to claim 12 wherein step f) forms corrected density representative digital signals by determining $$\begin{bmatrix} R_{\gamma c} \\ G_{\gamma c} \\ B_{\gamma c} \end{bmatrix} = [M] * \begin{bmatrix} R \\ G \\ B \end{bmatrix} = \begin{bmatrix} a_1 & a_4 & a_5 \\ a_7 & a_2 & a_6 \\ a_8 & a_9 & a_3 \end{bmatrix} * \begin{bmatrix} R \\ G \\ B \end{bmatrix}$$

and the gamma correction values of matrix M, a1 through a9, are determined based on the regression of said density representative digital signals corresponding to said reference patches with standard film density values.

14. A method for producing photographic images from a negative working photographic film strip, of the type that uses density values of the photographic film strip to determine the density values of the produced photographic images, the improvement comprising the steps of:

a) forming at least two reference patches of differing exposure conditions onto an otherwise unexposed portion of the photographic film strip prior to photographic processing, each reference patch falling within the total scale of the photographic film strip;

b) photographically processing the photographic film strip to form densities corresponding to the photographic images and said reference patches;

c) scanning said processed photographic film strip to form density representative digital signals corresponding to the photographic images, said reference patches, and an unexposed region of the photographic film strip;

d) obtaining standard film density values representative of the photographic film strip;

e) calculating gamma correction values from said density representative digital signals corresponding to said reference patches and said standard film density values;

f) utilizing said calculated gamma correction values, said density representative digital signals corresponding to the photographic images, said density representative digital signals corresponding to the unexposed region of the photographic film strip, and said standard film density values to form corrected density representative digital signals; and g) utilizing said corrected density representative digital signals to produce photographic images from the images recorded on the photographic film strip.

15. A method according to claim 14 wherein two reference patches are used and the calculation of said gamma correction values is performed by determining:

$$\Delta \gamma_D = \frac{D_H{}^o - D_L{}^o}{D_H - D_L}$$

16. A method according to claim 14 wherein three or more reference patches are used and said gamma correction values are determined based on the regression of said density representative digital signals corresponding to said reference patches with standard film density values.

17. A method according to claim 14 wherein step f) forms corrected density representative digital signals by determining:

$$D_{\gamma c} = (D - D_{min}) * \Delta \gamma + D^o{}_{min}.$$

18. A method according to claim 14 wherein said gamma correction values, said density representative digital signals corresponding to the unexposed region of the photographic film strip, and said standard film density values take the form of one dimensional look-up-tables relating said density representative digital signals corresponding to the photographic images to said corrected density representative digital signals.

19. A method for producing photographic images from a negative working photographic film strip, of the type that uses density values of the photographic film strip to determine the density values of the produced photographic images, the improvement comprising the steps of:

a) forming at least two reference patches of differing exposure conditions onto an otherwise unexposed portion of the photographic film strip prior to photographic processing, each reference patch falling within the total scale of the photographic film strip;

b) photographically processing the photographic film strip to form densities corresponding to the photographic images and said reference patches;

c) scanning said processed photographic film strip to form density representative digital signals corresponding to the photographic images, said reference patches, and an unexposed region of the photographic film strip;

d) obtaining standard film density values representative of the photographic film strip;

e) calculating gamma correction values from said density representative digital signals corresponding to said reference patches and said standard film density values;

f) calculating speed correction values from said density representative digital signals corresponding to said reference patches, density representative digital signals corresponding to said unexposed region of the photographic film strip, and standard film density values;

g) utilizing said calculated gamma correction values, said calculated speed correction values, and said density representative digital signals corresponding to the photographic images, to form corrected density representative digital signals; and h) utilizing said corrected density representative digital signals to produce photographic images from the images recorded on the photographic film strip.

20. A method according to claim 19 wherein two reference patches differing only in exposure intensity are used and the calculation of said gamma correction values is performed by determining:

$$\Delta \gamma_D = \frac{D_H{}^o - D_L{}^o}{D_H - D_L}$$

21. A method according to claim 19 wherein two reference patches are used and the calculation of said speed correction value(s) is performed by determining:

$$\Delta Spd_D = Spd_D - Spd_D{}^o \text{ where } Spd_D =$$

$$\frac{D_{min} - \left( D_L - \left( \frac{D_H - D_L}{E_H - E_L} * E_L \right) \right)}{\frac{D_H - D_L}{E_H - E_L}}$$

22. A method according to claim 19 wherein three or more reference patches are used and said gamma correction values and said speed correction values are determined based on the regression of said density representative digital signals corresponding to said reference patches and said unexposed region of the photographic film strip with said standard film densities.

23. A method according to claim 19 wherein step g) forms corrected density representative digital signals by determining:

$$D_{\gamma c}=D*\Delta\gamma_D-\Delta Spd_D*\gamma_D.$$

24. A method according to claim 19 wherein said gamma correction values and speed correction values take the form of one dimensional look-up-tables relating said density representative digital signals corresponding to the photographic images to said corrected density representative digital signals.

25. A method for producing photographic images from a negative working photographic film strip, of the type that uses R, G, and B, density values of the photographic film strip to determine the R, G, and B, density values of the produced photographic images, the improvement comprising the steps of:
   a) forming at least three reference patches of differing exposure conditions onto an otherwise unexposed portion of the photographic film strip prior to photographic processing, each reference patch falling within the total scale of the photographic film strip;
   b) photographically processing the photographic film strip to form densities corresponding to the photographic images and said reference patches;
   c) scanning said processed photographic film strip to form R, G, and B, density representative digital signals corresponding to the photographic images, said reference patches, and an unexposed region of the photographic film strip;
   d) obtaining standard film R, G, and B, density values representative of the photographic film strip;
   e) calculating a gamma correction matrix from said R, G, and B, density representative digital signals corresponding to said reference patches and said standard film R, G, and B, density values;
   f) calculating R, G, and B, speed correction values from said R, G, and B, density representative digital signals corresponding to said reference patches, R, G, and B, density representative digital signals corresponding to said unexposed region of the photographic film strip, and said standard film R, G, and B, density values;
   g) utilizing said calculated gamma correction matrix, said R, G, and B, density representative digital signals corresponding to the photographic images, said R, G, and B, density representative digital signals corresponding to the unexposed region of the photographic film strip, and said standard film R, G, and B, density values to form corrected R, G, and B, density representative digital signals; and
   h) forming R, G, and B, channel independent density representative digital signals from said corrected R, G, and B, density representative digital signals;
   i) forming R, G, and B, log exposure representative digital signals from said R, G, and B, channel independent density representative digital signals;
   j) utilizing said R, G, and B, speed correction values and said R, G, and B, log exposure representative digital signals to form corrected R, G, and B, log exposure representative digital signals; and
   k) utilizing said corrected R, G, and B, log exposure representative digital signals to produce photographic images from the images recorded on the photographic film strip.

26. A method according to claim 25 wherein step j) forms corrected R, G, and B, log exposure representative digital signals by subtracting said R, G, and B speed correction values from said R, G, and B log exposure representative digital signals.

27. A method according to claim 25 wherein steps e) through j) are implemented in a 3D look-up-table.

* * * * *